(12) United States Patent
Park

(10) Patent No.: US 9,651,077 B2
(45) Date of Patent: May 16, 2017

(54) FASTENER FOR LOW DENSITY MATERIALS

(71) Applicant: Simpson Strong-Tie Company, Inc., Pleasanton, CA (US)

(72) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 14/679,804

(22) Filed: Apr. 6, 2015

(65) Prior Publication Data

US 2016/0290381 A1 Oct. 6, 2016

(51) Int. Cl.
*F16B 35/04* (2006.01)
*F16B 25/00* (2006.01)
*F16B 35/06* (2006.01)

(52) U.S. Cl.
CPC ...... *F16B 25/0042* (2013.01); *F16B 25/0015* (2013.01); *F16B 25/0063* (2013.01); *F16B 25/0068* (2013.01); *F16B 25/0073* (2013.01); *F16B 35/065* (2013.01)

(58) Field of Classification Search
CPC ............. F16B 25/0042; F16B 25/0047; F16B 25/0057; F16B 25/0068; F16B 35/04
USPC ................................. 411/399, 412
See application file for complete search history.

(56) References Cited

U.S. PATENT DOCUMENTS

| 1,627,912 | A | * | 5/1927 | Lomason | ............... | F16B 35/06 |
| | | | | | | 280/163 |
| 1,821,709 | A | * | 9/1931 | Hoerr | ..................... | F16B 35/06 |
| | | | | | | 411/399 |
| 1,830,554 | A | * | 11/1931 | McMullin | ............ | F16B 33/004 |
| | | | | | | 411/399 |
| 3,351,115 | A | * | 11/1967 | Boehlow | ............ | F16B 25/0047 |
| | | | | | | 411/168 |

(Continued)

FOREIGN PATENT DOCUMENTS

EP 2317159 A1 5/2011

OTHER PUBLICATIONS

International Search Report and Written Opinion dated Jun. 20, 2016 in PCT Application No. PCT/US2016/026217.
English Abstract of EP2317159A1, published May 4, 2011.

*Primary Examiner* — Roberta Delisle
(74) *Attorney, Agent, or Firm* — Vierra Magen Marcus LLP

(57) ABSTRACT

A fastener includes a shank having a first end and a second end. The fastener includes a first thread region adjacent to the first end having a first helical thread and a second helical thread interposed with the first helical thread in the first thread region. A second thread region is provided adjacent to the first thread region, the second thread region including only the second helical thread with the second helical thread having a diameter greater than a diameter of the first helical thread. A third thread region having a third helical thread is provided extending from the second thread region toward the second end. A head is provided on the second end and includes a disk and an octagonal boss between the disk and the third thread region, the boss including four major sides extending perpendicular to the disk and four chamfered sides, the chamfered sides being flush with a side edge of the disk.

19 Claims, 3 Drawing Sheets

(56) References Cited

U.S. PATENT DOCUMENTS

| | | | | |
|---|---|---|---|---|
| 3,703,843 | A | * | 11/1972 | Laverty ............... F16B 25/0031 411/413 |
| RE28,111 | E | * | 8/1974 | Laverty ............... F16B 25/0031 411/412 |
| 4,241,638 | A | * | 12/1980 | Shimizu .............. F16B 25/0031 411/386 |
| 5,683,217 | A | * | 11/1997 | Walther ................ F16B 35/065 411/399 |
| 6,302,631 | B1 | * | 10/2001 | Takasaki ............... F16B 35/065 411/399 |
| 7,604,445 | B1 | * | 10/2009 | Dicke .................. F16B 35/065 411/188 |
| 7,682,119 | B2 | * | 3/2010 | Chen .................. F16B 25/0015 411/411 |
| 8,342,788 | B2 | * | 1/2013 | Matthiesen ......... F16B 25/0021 411/386 |
| 8,632,289 | B2 | * | 1/2014 | Shinjo .................... F16B 25/00 411/387.4 |
| 2007/0217887 | A1 | * | 9/2007 | Lin .................... F16B 23/0015 411/413 |
| 2007/0297871 | A1 | * | 12/2007 | Lu ....................... F16B 25/0015 411/387.1 |
| 2009/0010734 | A1 | * | 1/2009 | Lin .................... F16B 23/0015 411/413 |
| 2011/0217145 | A1 | * | 9/2011 | Kochheiser ............. B23P 11/00 411/412 |
| 2012/0207564 | A1 | * | 8/2012 | Kochheiser ......... F16B 25/0031 411/412 |
| 2013/0302110 | A1 | | 11/2013 | Park |

\* cited by examiner

FASTENER FOR LOW DENSITY MATERIALS

BACKGROUND

Variations in fastener design have been used to improve different characteristics and performance of fasteners depending on the intended use of the fastener. In general, a screw-type fastener includes a threaded shank with a pointed tip at one end thereof and a head at the other end. The head has a recess or other connector to accept a driving tool tip.

Fastener design can vary based on whether the design is used as a self-drilling fastener, or used with a pre-drilled bore, and based on the type of material for which the fastener is to be used. One type of material for which specialized fasteners provide advantages are low density materials, such as cellular PVC (polyvinyl chloride). Cellular PVC is a solid, extruded material that has the working characteristics of wood, and is used for interior trim, exterior trim, and paneling as well as windows and doors, blinds, and furniture.

Low density materials present issues with fastener pulldown and so-called pig-tailing, where portions of the material are extruded by the movement of the fastener into the material. The material extruded by the fastener takes the shape of a pig-tail which must thereafter be removed to provide a finished work.

SUMMARY

Technology is described herein which comprises a fastener having features allowing easy installation and reduced stress when installed in low density materials. In one embodiment, a fastener includes a shank having a first end and a second end. The fastener includes a first thread region adjacent to the first end having a first helical thread and a second helical thread interposed with the first helical thread in the first thread region. A second thread region is provided adjacent to the first thread region, the second thread region including only the second helical thread with the second helical thread having a diameter greater than a diameter of the first helical thread. A head is provided on the second end and includes a disk and an boss between the disk and the third thread region.

In one embodiment, a third thread region having a third helical thread is provided extending from the second thread region toward the second end. In another embodiment, the boss is an octagonal boss.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
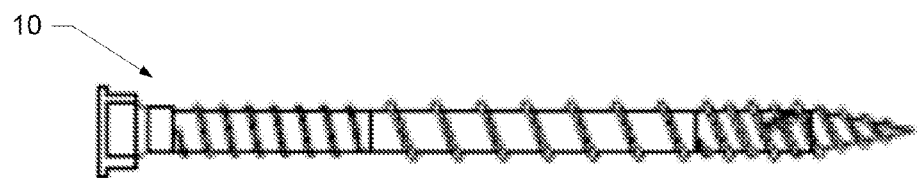
FIG. 1 depicts a plan view of a first embodiment of a fastener in accordance with the present technology.
Figure 2:
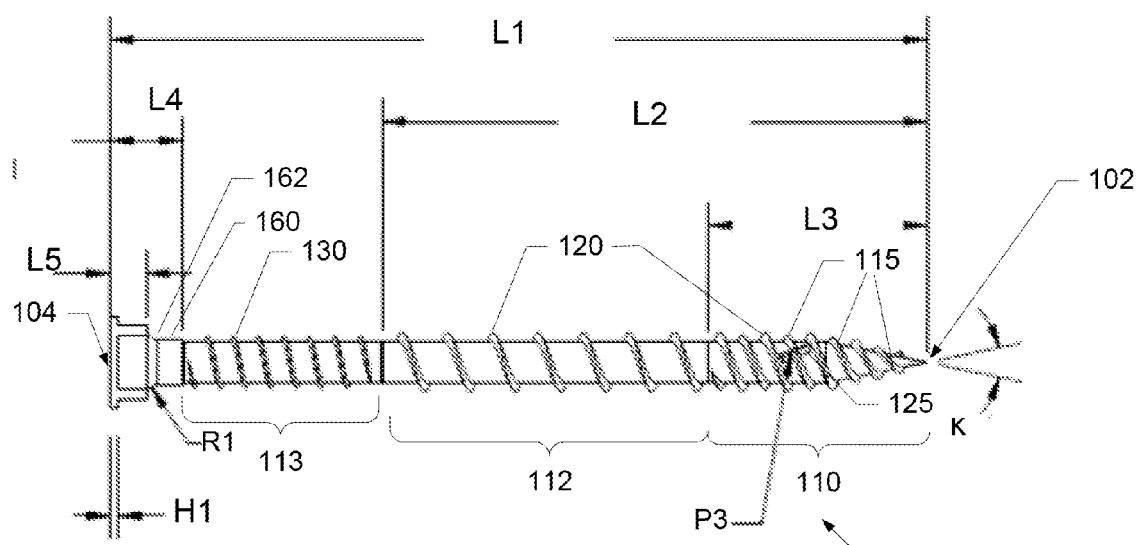
FIG. 2 depicts a second plan view of a first embodiment of a fastener in accordance with the present technology.

The technology described herein is a fastener having features allowing for in a relatively low density material.

A first embodiment of the fastener technology will be described with respect to FIGS. 1-6.

A fastener 10 includes a shank 100 having a first end with a pointed tip 102 at and a second end having a head 104. The shank may be formed of steel or any of a number of various materials. The fastener 10 includes a first section or region 110 including the pointed end 102, a second section or region 112, and a third section or region 113. The three threaded sections 110, 112, and 113 pull the fastener down by rotation of the fastener so that a head of the fastener engages and sinks into the material and secures the material to the frame.

The first section 110 includes two helical threads 115 and 120. Thread 120 continues into region 112 while thread 115 terminates at a second end of region 110 opposite tip 102. Thus only thread 120 is provided in region 112. Thread 130 is provided in region 113.

The body of the shank has a minor diameter Dm which in one embodiment may be about 0.110-0.120 inch. Each thread forms a diameter relative to the shank. Each thread is formed by opposing walls creating a triangular cross section where the angle characteristic of the cross-sectional shape is often called the thread angle.

A "high" thread 120 in sections 110 and 112 has a diameter H2 of 0.160-0.170 and is formed by a triangular cross-section of opposing walls having an angle theta ($\theta$) of about 40 degrees. A forward thread 115 has a diameter H1 of 0.135-0.150 inch and is formed by opposing walls having an angle beta (B) of about 50 degrees. Turns of forward thread 115 are interposed between turns for high thread 120 in region 110. Both threads 120 and 115 start at the pointed end 102. Rear thread 130 has a diameter of about 0.138-0.151 inch and is formed by opposing walls having an angle an angle alpha ($\alpha$) of about 50 degrees.

The fastener has a total length L1 from the top of the head to the point 102. Region 110 has a length L3 and region 112 a length L2. The head 104 has a height L5 with the distance from a top of the head 104 to region 113 being L4. Where L1 defines a fastener having a length of about 2.250±0.025 inch, L3 Is about 0.6 inch and L2 is about 1.500±0.04 inch. L4 may be about 0.18-0.22 inch and L5 may be about 0.095-0.105 inch.

Thread 115 and thread 120 have a pitch P1, with thread 120 and thread 115 separated by a distance D1 in region 110. Thread 130 has a pitch P2. In the above embodiment where L1 is 2.25 inch, P1 may be 0.125 inch, L1 may be 0.062 inch and P2 may be 0.070 inch.

In one embodiment, a helical ridge 125 intersects thread 115 in a portion of region 110. Helical ridge has an opposing turn direction and a pitch P3 of about 0.8 inch. It should be noted that in one embodiment the helical ridge does not intersect thread 120; in an alternative embodiment, the ridge intersects both threads 115 and 120, or only thread 120.

The fastener is designed such that the double thread in region 110 creates a pilot bore in the material to be fastened, with the thread 120 in region 112 bearing most of the securing load and the thread 130 being of lower height (diameter) relative to the shank acting to pass extruded material toward the head 104.

Figure 3:
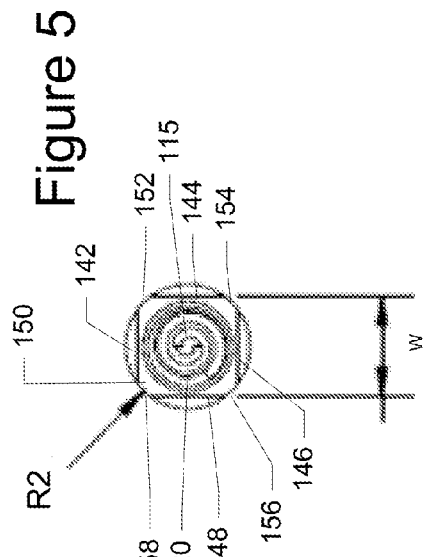
FIG. 3 depicts a partial perspective view of the head of the fastener in accordance with the present technology.
Figure 4:
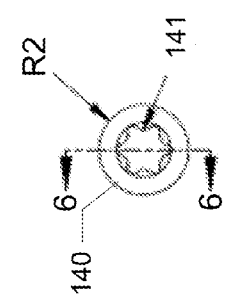
FIG. 4 depicts a head end view of the fastener.
Figure 5:
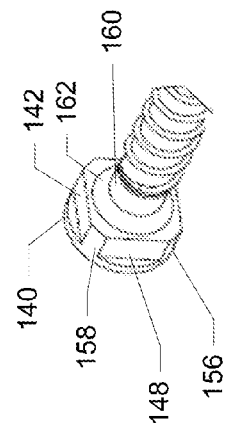
FIG. 5 depicts a tip end view of the fastener.
Figure 6:
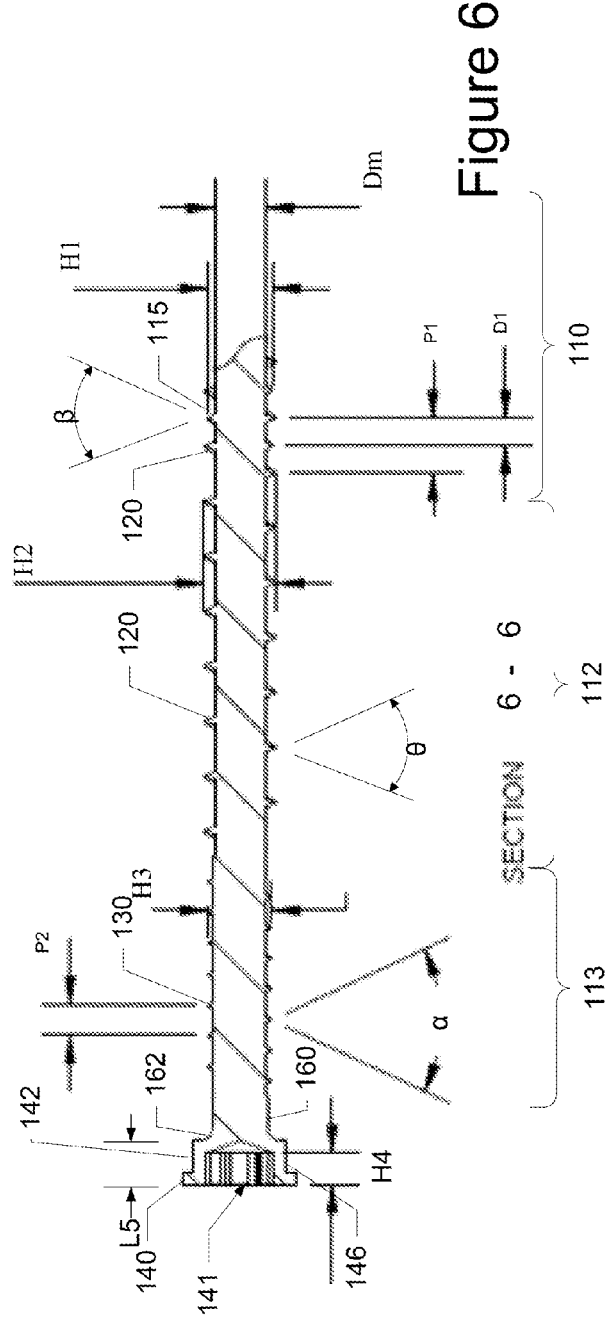
FIG. 6 is a cross-sectional view along line 6-6 of FIG. 4.

Head 104 is constructed to provide a counter-sink relative to the material and simultaneously clip off any pigtail created by the material being extruded. FIG. 3 is a perspective view of the head 104. FIG. 4 is a top view of the head and FIG. 5 an end view of the fastener illustrating additional features of the head 104. In the above embodiment (of a fastener of length 2.25 inches, head 103 may have a circular disk 140 having a diameter R2 of about 0.255 inch. Between the disk and the shank is an octagonal boss 150. The octagonal boss 150 has four major sides 142, 144, 146, 148 and four chamfered edges or sides 152, 154, 156, 158. Each of the four major sides and four chamfered edges is arranged symmetrically around an axis passing through the center of the shank. As illustrated in FIG. 3 with respect to side 158, each chamfered edge 152, 154, 156, 158 creates a flush, uninterrupted surface with a portion of the side of disk 140 as illustrated in FIG. 3. The octagonal boss 150 is joined to the shank and third region 114 by a radial edge 162 and a shoulder or collar 160, the radial edge having a radius R1 of, for example, 0.25-0.35 inch. Head 140 has a recess 141 provided at a depth H4 below disk 142. Recess 141 may be any shape and depth H4 may be in a range of about 0.06-0.08 inch where head height H5 is about 0.1 inch. It should be understood that boss 150 may have a few as three sides or any number of additional sides. The sides may be symmetrically arranged as in the illustrated embodiment or asymmetrically arranged.

In one embodiment of a fastener having a total overall length L1 of about 2.25 inch, the relationship between the following elements includes one or more of the following:
  a. P1 is greater than P2 such that P2:P1 is in a range of about 1.7:1 to 2:1;
  b. A ratio of a length region 112 to a length of region 110 is about 1.25-1.75 to 1.
  c. A ratio of a length of region 112 to region 113 is about 1.1-1.3 to 1.
  d. A ratio of H2 to H1 is between greater than 1.0:1 and 1.3 to 1.
  e. Alpha and Beta are each greater than Theta in a ratio of about 1.1-1.4.

The head disk diameter R1 is greater than the minor diameter Dm in a range of about 2.5:1 to 2:1.

Figure 7:
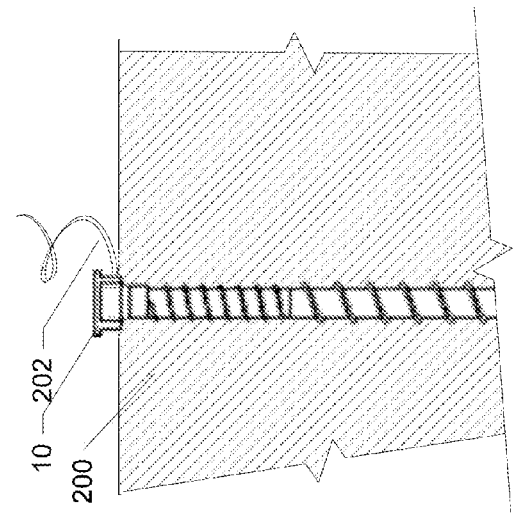
FIGS. 7-9 illustrate a fastener installation in a low density material.
Figure 8:
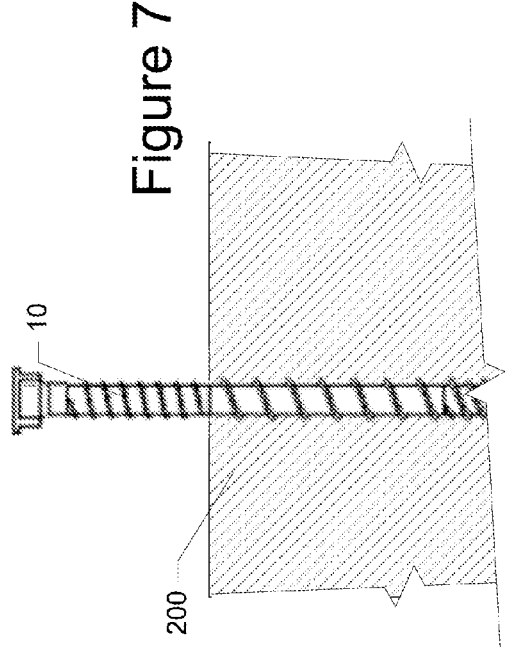
Figure 9:
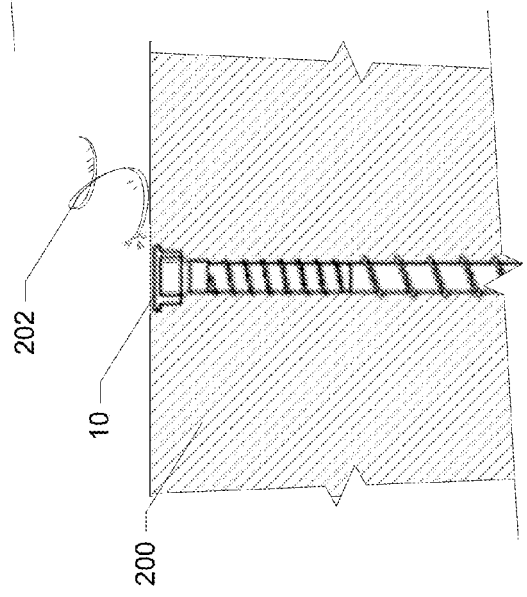

FIGS. 7-9 illustrate the progression of the fastener 10. When the fastener 10 is driven into a material, the cutting tip and drill section bore out material as the fastener is pressed and rotated (using for example a power drilling tool) into a material. Because region 110 is double threaded with thread formed of differing angles (40 degrees for thread 120 and 50 for thread 115) the cutting tip effectively bores into a low density material and evacuates portions of the material as it enters. Section 112 allows movement of the fastener in the material without further damage to the bore until region 112 reaches the material. Because region 113 has a lower diameter and smaller pitched thread 130, it effectively evacuates the pigtail formed by the rotation of the fastener until head 104 removes the pigtail. As illustrated in FIGS. 8 and 9, the head 104 will create a counter-sink in the material 200 using the octagonal bore 150, while disk 140 finishes clipping the pigtail 202 upon entry into the material 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
    a shank having a first end having a point and a second end having a head, and having a diameter, the shank including
    a first region beginning at the first end and including a first helical thread and a second helical thread interposed between turns of the first helical thread; and
    a second region extending from the first region and including the second helical thread;
    wherein the first helical thread has a first thread angle and the second helical thread has a second thread angle smaller than the first thread angle;
    wherein the head includes a disk and a boss between the disk and the shank, the boss including a plurality of symmetric sides, ones of the plurality of symmetric sides mating with a side edge of the disk.

2. The fastener of claim 1 wherein the shank further includes a third region having a third helical thread, the third region located between the second region and the head.

3. The fastener of claim 1 wherein the third helical thread has a third thread angle which equals the first thread angle.

4. The fastener of claim 1 wherein the first helical thread has a first diameter and the second helical thread has a second, greater diameter.

5. The fastener of claim 1 wherein the ratio of the second diameter to the first diameter is between greater than 1.0:1 and up to 1.3:1.

6. The fastener of claim 1 wherein the boss comprises at least four symmetric sides, each side joined to a respective side by a chamfered edge, the chamfered edge mating with the side of the disk.

7. The fastener of claim 1 wherein the shank is joined to the boss by a radial edge.

8. The fastener of claim 1 wherein the first thread angle is fifty degrees and the second thread angle is 40 degrees.

9. The fastener of claim 1 wherein a length of the second region is longer than a length of the first region by about 1.25-1.75 to 1.

10. The fastener of claim 1 wherein the shank further includes a third region having a third helical thread, the third region extending from the second region to the head, a radial edge between the boss and the third region, wherein the boss comprises an octagonal boss having four major sides, each major side joined to another side by a chamfered edge, the chamfered edge comprising the ones of the symmetric sides mating with the side edge of the disk.

11. A fastener, comprising:
    a shank having a first end and a second end, the shank including
    a leading thread region and a second thread region, the leading thread region adjacent to the first end having at least a first diameter helical thread therein, the second thread region adjacent to the leading thread region, the second thread region including the first diameter helical thread; and
    a head at the second end, the head includes a disk and a boss between the disk and the shank, the boss including a plurality of sides extending perpendicular to the disk, the plurality of sides including four major sides, each major side joined to another major side by a chamfered edge, each chamfered edge mating with a side edge of the disk.

12. The fastener of claim 11 further including a second diameter helical thread in the leading thread region, the second diameter helical thread having a diameter smaller than the first diameter helical thread and interposed with the first helical thread in the leading thread region.

13. The fastener of claim 12 wherein each helical thread has a thread angle, and wherein:
the first helical thread has a thread angle greater than the second helical thread.

14. The fastener of claim 13 further including a trailing thread region extending from the second thread region toward the second end, the trailing thread region including a third diameter helical thread.

15. The fastener of claim 14 wherein the third diameter helical thread has a diameter smaller than a diameter of the first helical thread.

16. The fastener of claim 15 wherein the third diameter helical thread has a thread angle larger than the second diameter thread.

17. The fastener of claim 16 further including a collar between the trailing thread region a radial edge, the radial edge joining the collar and the shank to the head.

18. The fastener of claim 11 wherein the boss comprises an octagonal boss with each of the major sides, and each chamfered edge comprising a planar surface.

19. A fastener, comprising:
a shank having a first end and a head at a second end, the fastener including
a first thread region adjacent to the first end having a first helical thread with a first twist direction and a second helical thread with the first twist direction, the second helical thread interposed with the first helical thread in the first thread region;
a second thread region adjacent to the first thread region, the second thread region including only the second helical thread, the second helical thread having a diameter greater than a diameter of the first helical thread;
a third thread region having a third helical thread, the third thread region extending from the second thread region toward the second end; and
wherein the head includes a disk and an octagonal boss between the disk and the third thread region, the boss including four planar major sides extending perpendicular to the disk and four chamfered planar sides connecting respective major sides, the chamfered sides being flush with a side edge of the disk.

* * * * *